United States Patent Office 2,969,911
Patented Jan. 31, 1961

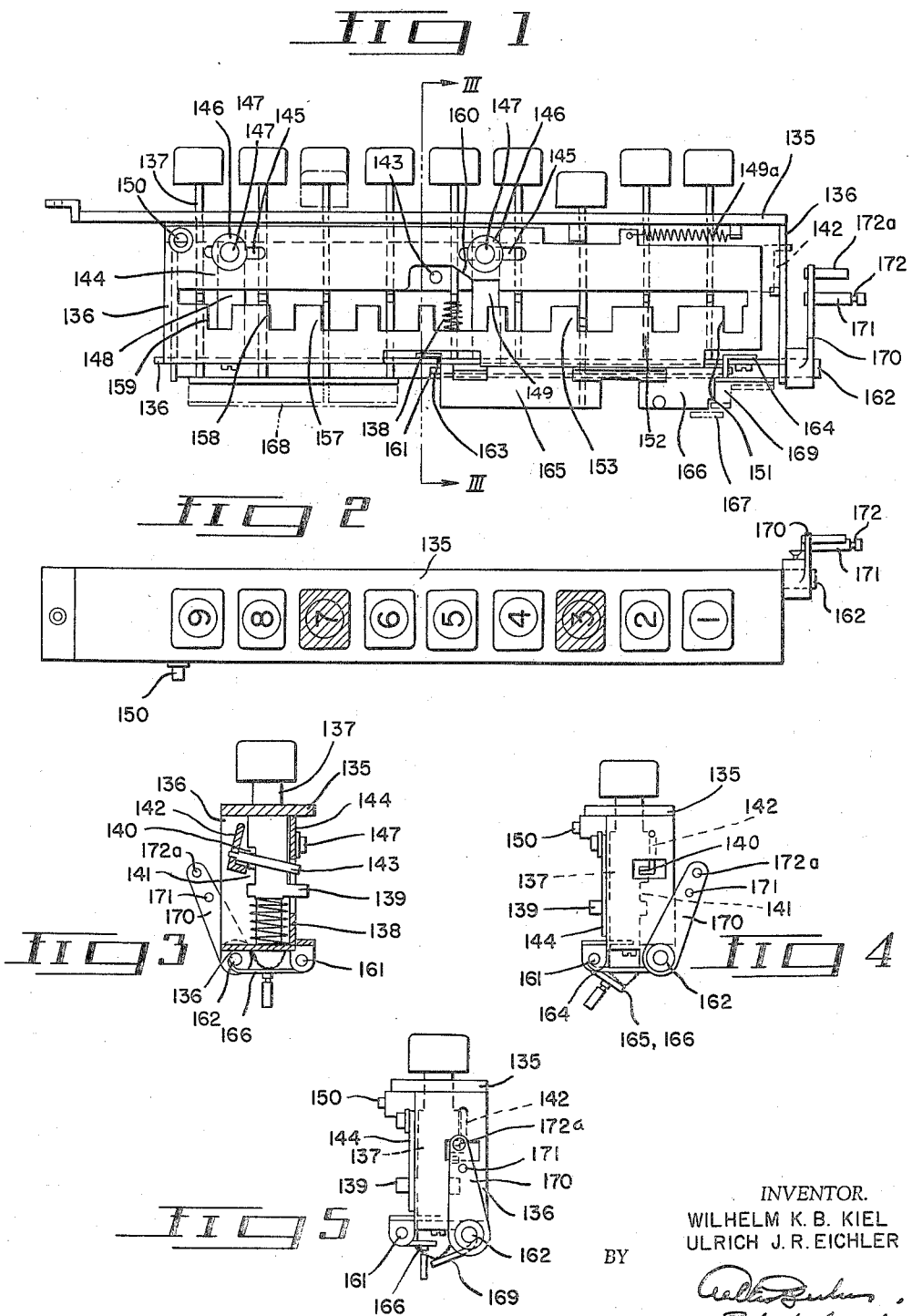

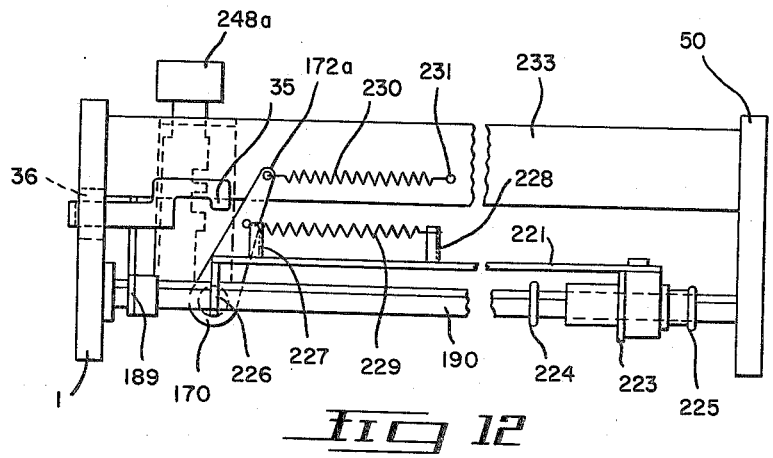
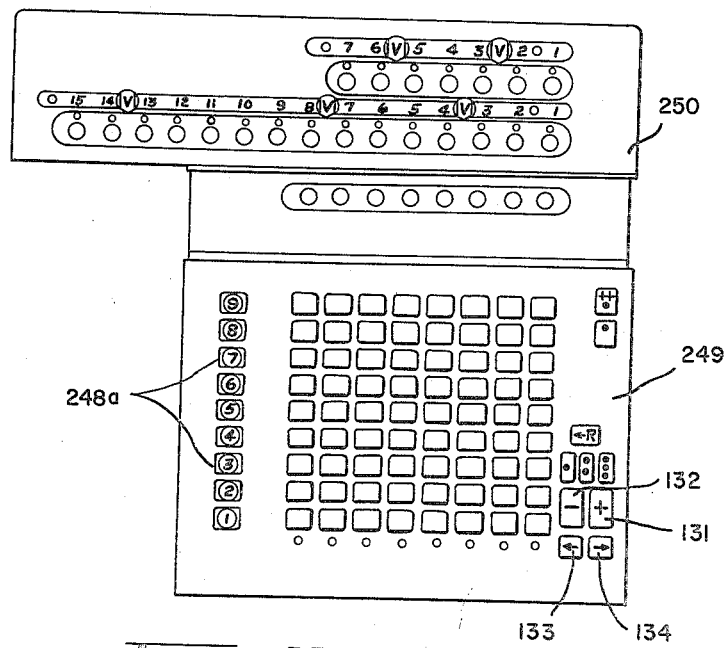
INVENTOR.
WILHELM K. B. KIEL
BY ULRICH J. R. EICHLER

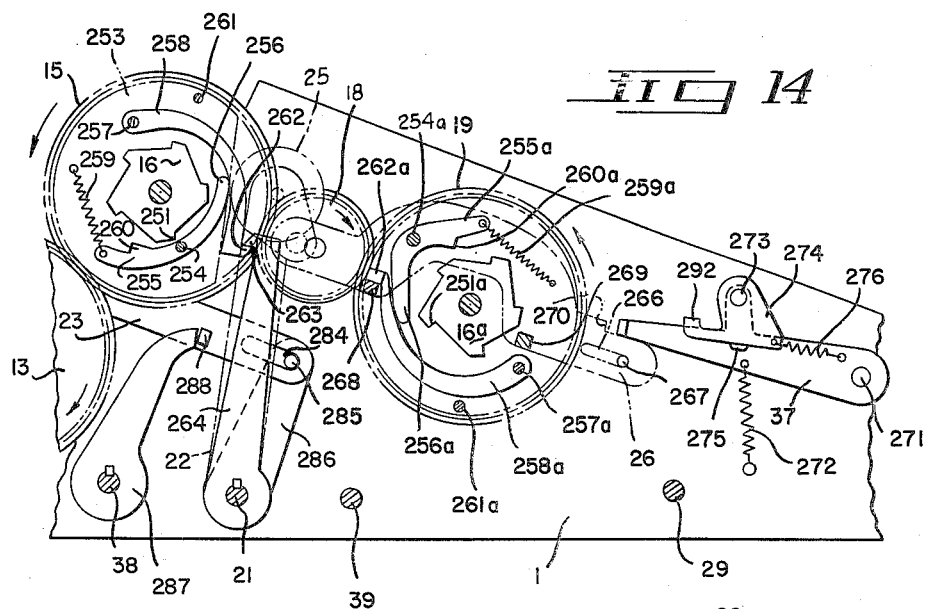

---

2,969,911

CALCULATING MACHINE ACTUATOR AND CARRIAGE CONTROL

Wilhelm K. B. Kiel, Nurnberg, and Ulrich T. R. Eichler, Nurnberg-Ebensee, Germany; said Kiel, assignor, to Metall-Guss und Presswerk Heinrich Diehl G.m.b.H., Nurnberg, Germany Filed Aug. 8, 1952, Ser. No. 303,392

Claims priority, application Germany Aug. 11, 1951

7 Claims. (Cl. 235—63)

The present invention relates to calculating machines and, more particularly, to a further improvement of the calculating machine described in our co-pending application Ser. No. 298,806 filed July 14, 1952, now Patent No. 2,936,952. In our said co-pending application there is described a calculating machine in which the control trains for various and different type functions of the machine are actuated by power-operated control members which are controlled by command members operated by the function control keys. Said control members are preferably grouped together in magazines and, designed as similar levers, are subjected to the pull of a strong spring while they are rockably mounted adjacent to each other about a shaft common to them. In the said co-pending application, it has been further suggested to split up the control members, controlled by command members, into a plurality of groups, especially two groups. One of these groups is intended for addition and subtraction control, while the other group governs the leftward-rightward shift of the carriage and possibly also other functions, for instance, the clearing of the main accumulator mechanism and of the revolutions counting mechanism. In order to be able to work with the calculating machine without encountering mechanical disorders, the said co-pending application also suggests the mutual locking of the two control train groups. This locking is effected in such a manner that when the commands for initiating operation of the said two control trains, are given simultaneously or in quick succession, one command is executed first while the other command is stored, which latter command is subsequently executed. The arrangement is such that when a calculating and a carriage shift command are given simultaneously, first the calculating command and subsequently the shift command is executed. Special resetting means are provided for the various groups of control members; particularly the resetting of the control members for the addition and subtraction control is effected by the main actuating shaft in cooperation with a cam disc, while the resetting of the group is, for instance, through the intervention of an eccentric, derived from the output side of a drive shaft provided for the carriage shift and other functions.

The control members provided in the machine and grouped in magazines may according to the said co-pending application be operated selectively by means of manually operable keys or automatically by means of cams or control templates operated by the machine. Thus, the said co-pending application described an embodiment for carrying out an automatic division, in which the command members for the control members are operated in a predetermined sequence by a control template having the form of a shaft provided with pins. After the division operation has been manually initiated, the said control template is automatically controlled by a mechanism from different parts of the calculating machine in order to carry out the dividing process.

It is an object of the present invention further to improve the calculating machine of our said co-pending application by providing the said machine with a multiplication device in which the two commands for calculating and carriage shift are for all practical purposes simultaneously given to the control members.

It is a further object to provide an improved calculating machine according to the preceding paragraph, in which the time for carrying out a correct multiplication will be reduced to a minimum.

According to the invention, in order to reduce the multiplication process to as short a time as possible, use is made of a short-cut automatic multiplying device. The said device comprises the keys "0 to 9," or "1 to 9" and is so arranged that, when depressing the keys "6 to 9," the multiplying operation will be a short-cut, i.e. instead of the corresponding numbers of plus rotations of the differential actuator mechanism, there will be carried out a number of minus rotations corresponding to the complemental value, and a plus correction in the next higher decade.

Calculating machines with multiplication devices working according to this short-cut system are known per se. However, these known devices have numerous drawbacks. Thus, a number of machines on the market have the drawback that, when pressing the multiplier keys of the machine too quickly in succession, the machines will calculate incorrectly. Most of the known machines of this type furthermore are relatively complicated in structure and have the further disadvantage that relatively large key-strokes and high key pressures are required for operating the multiplier keys.

It is, therefore, an object of the present invention to overcome the last mentioned drawbacks.

It is a still further object of this invention to provide a calculating machine having a multiplying device which will allow extremely fast operation of the multiplier keys while assuring a correct operation without applying high key pressures or relatively large key strokes.

Another object of this invention consists in the provision of a calculating machine according to the preceding paragraphs which will be simple in construction and operation.

These and other objects and advantages of the invention will appear more clearly from the following specification in connection with the accompanying drawings in which:

Figure 1 illustrates a side view of a key-bank of the multiplying device which key-bank comprises the keys 1 to 9.

Figure 2 shows a top view of the key-bank illustrated in Figure 1.

Figure 3 is a cross-section through the key-bank taken along the line 3—3 of Figure 1, the selector keys not being depressed.

Figure 4 is a right-side view of the key-bank according to Figures 1 and 2 with the key 3 depressed, while the other keys have been omitted.

Figure 5 is a view similar to that of Figure 4 showing the selector key corresponding to the numeral 7 in depressed position while the remaining keys have been omitted.

Figure 12 is a front view of the calculating machine with those parts not esesntial for the understanding of the invention likewise omitted.

Figure 13 illustrates on a reduced scale a top view of the entire calculating machine with the carriage in its normal or basic position.

Figure 14 is a sectional view of the outside of the left frame wall.

Figure 15 is a perspective sectional view of the inner side of the right frame wall according to Figure 7.

*General arrangement*

Figure 6:
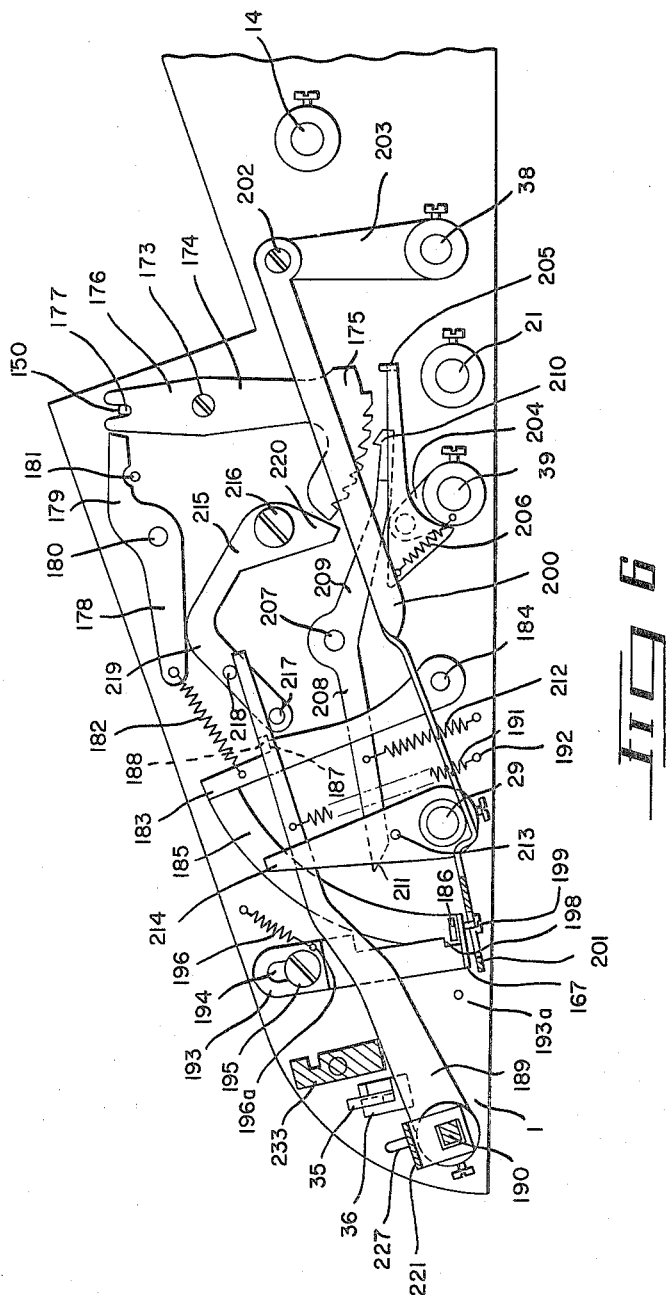
Figure 6 is a view of the inside of the left frame wall of the calculating machine and of the levers of the multiplying device cooperating with the multiplier key-bank.

Most of the known multiplying devices operate by entering the multiplier digits starting with the lowest denominational order. When the multiplier selector keys corresponding to the numerals 1 to 5 are depressed, the machine carries out plus rotations and subsequently automatically adjusts the accumulator carriage to the next higher decade. For the digits "6 to 9," the machine carries out from four to one negative rotations, respectively, whereafter the machine adjusts the carriage to the next higher decade, and carries out a positive corrective rotation. The invention preferably relates to a machine which carries out the above-mentioned operations during the multiplying process.

The multiplying device according to the present invention is characterized by the following features:

Due to the characteristic that the calculating machine provided with a control center is intended successively to execute commands given simultaneously or quickly in succession, the commands concerning calculation and carriage shift given by depressing the selector keys, can be entered likewise simultaneously or after short time intervals.

When depressing the multiplier keys "6 to 9," first the control train is adjutsed so that a subtraction command is given instead of an addition command. If the machine is additionally equipped with a device for a negative multiplication with which the calculated product is to be subtracted from a number set in the accumulator, this process is carried out in the reverse manner, i.e. from a minus starting position into a plus position. In both instances the command "carriage shift" is maintained unchanged.

With the changeover from addition to subtraction, a further control train for corrective calculation is prepared, which latter becomes effective subsequent to the carriage shift and releases the command member for the corrective rotation. This control train may preferably be in the form of a two-arm lever which due to the subtraction command brought about by operation of the multiplier keys "6 to 9" comes into the range of a control cam connected to the output side of the carriage shift clutch. The said two-arm lever thus initiates the corrective command by actuation of a control train operatively connected with the command lever for addition. This lever is subsequently automatically returned to its ineffective position.

The control members of the control center which have been selected by the multiplier keys are actuated by a control train subjected to the action of power storage means. This power actuated control train is returned after completion of a number of calculating rotations, limited by an indexing segment, and is preferably returned by the indexing segment itself, at the end of the return movement of said indexing segment, so that the power storage means are again re-set.

The return of the indexing segment and the re-setting of the power storage means for the control train is effected by an indexing pawl which preferably is located on the same shaft as the restoring cams for re-setting the power control members for addition and subtraction located in the control center.

The calculating machine, according to the present invention, is provided with an auxiliary clutch which operates through a half cycle to engage the main clutch and which is re-engaged to complete its cycle when the main clutch is disengaged. Movement derived from this auxiliary clutch may be utilized for controlling the multiplying device preceding and following operation of the main clutch. Thus, between depression of a multiplier key and the start of the calculation operation proper a period is available in which control elements, for instance, the control segments of the multiplying device, may move into their predetermined positions. In this way, strong springs and thus hard control shocks will be avoided.

Furthermore, this auxiliary movement may be utilized to condition mechanism operable during the multiplying operation. Thus, for instance, it is necessary, when re-setting the control segment, to use a locking pawl which after each indexing step during the re-setting operation retains the control segment in its respective position. This locking pawl, however, must be returned when the control segment has been re-set so that without encountering obstacles, the control segment can be readjusted when a subsequent multiplier key is depressed. According to a further development of the invention, the engaging or return movement of this locking pawl can be derived from the movement of the said auxiliary clutch.

The multiplier control train leading to the command members of the control center must be retained in its adjusted position by a locking pawl until the required number of revolutions of the actuating shaft has been completed. Subsequently, this control train must return to its normal position. The actuation of this locking pawl, according to the invention, likewise can be derived from the auxiliary movement produced by the said auxiliary clutch.

*Structural arrangement*

The embodiment shown in the drawing is a motor calculating machine having a stepped cylinder differential actuating mechanism and an accumulator mechanism and revolutions counting mechanism carried by a movable carriage, and in which a full keyboard is provided for entering the multiplicand. Furthermore, the calculating machine is provided with a control center described in our co-pending application Ser. No. 298,806 and also, with a coupling device for the calculating mechanism, which coupling device comprises a main and an auxiliary clutch.

There will first be described the principle of construction and operation of the calculating machine without the multiplying device according to the invention.

*Main clutch*

Figure 9:
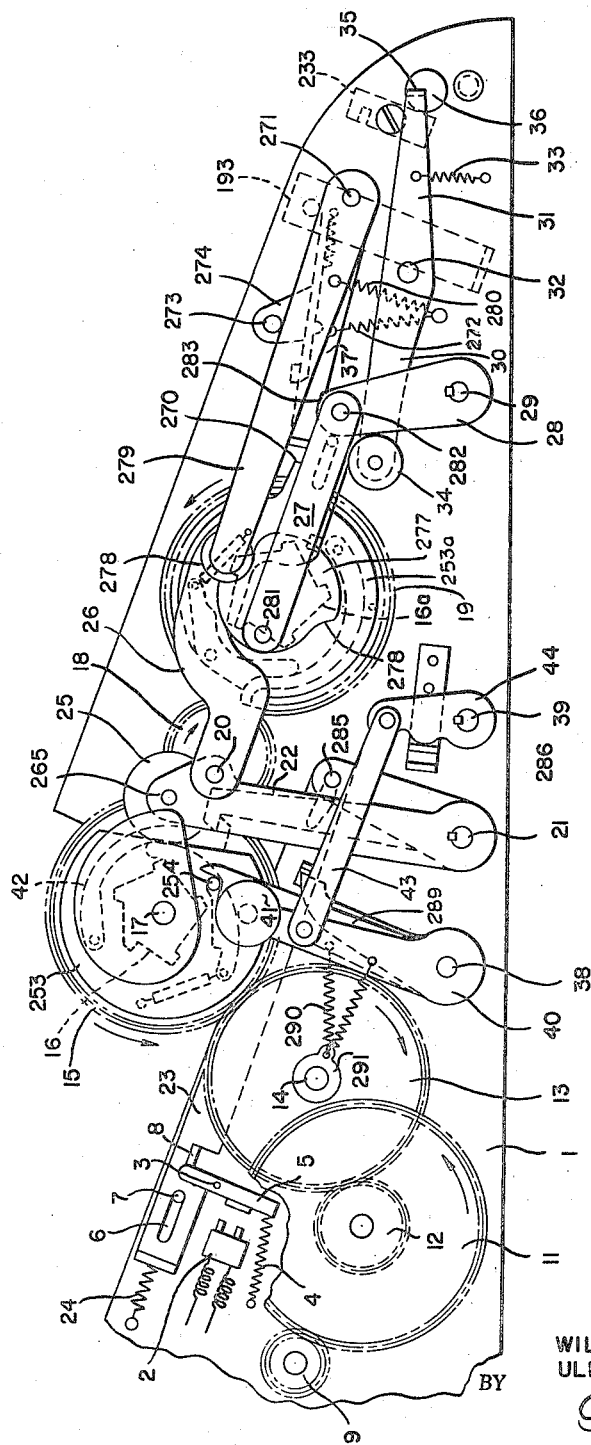
Figure 9 illustrates a view of the outside of the left frame wall which essentially comprises the contact device, a number of drive gears and some clutch means.

As will be evident from Figs. 9 and 14, the outside of the left frame wall of the calculating machine is provided with a contact mechanism 2 for an electric circuit. The contact lever 5 pivotally supported by the shaft 3 and adapted to be rocked by a tension spring 4 is made effective by the rail 23 through the intervention of an abutment 8. The rail 23 is guided by means of an oblong slot 6 and a screw 7 connected to the side wall. The reference numeral 9 designates a driving pinion which is connected with the motor 10 of the calculating machine and which by a gear system 11, 12, 13 is connected with the drive shaft 14 for the leftward-rightward carriage shift and which through a further gear 15 journalled on shaft 17 is connected with the jaw wheel or ratchet 16. This wheel 16 connected for rotation with gear 15 has five clutch jaws 251 which are circumferentially evenly distributed. The gear 15 meshes with an intermediate gear 18 freely rotatably journalled on the machine frame.

Gear 18 in its turn meshes with a gear 19 of the same size and shape as gear 15. The gear 19 is freely rotatably mounted on shaft 252 (Fig. 10) and is connected with a jaw wheel or ratchet 16a in a manner similar to the connection of wheel 16 with gear 15.

When the electric contacts 2, 5 are closed by the retraction spring 4, the gears 9, 11, 12, 13, 15, 18 and 19 begin to rotate in the directions indicated by the arrows, the jaw wheels 16, 16a likewise rotating in the direction of the arrows pertaining thereto. The gear transmission system 11, 12, 13 may also include a friction clutch in order to prevent damage to the electric motor 10 when the machine is blocked. For purposes of simplified identification, the clutch provided with the ratchet 16 will henceforth be called the main clutch, while the clutch provided with the ratchet 16a will henceforth be called the auxiliary clutch. The driven part of the main clutch consists substantially of a disc 253 rigidly connected to the shaft 17. The disc 253 is provided with a two arm lever 255, 256 rockable about a pivot 254, and a furthermore, with an indexing pawl 258 pivotable about a pivot 257. Furthermore mounted on the disc 253 is one end of a tension spring 259 the other end of which is connected to arm 255 of the two arm lever 255, 256. The arm 255 is provided with an abutment 260. The other arm 256 rests against the inner side of the pawl 258. The disc 253 is also provided with an abutment 261 for limiting the stroke of the pawl 258. The hook-shaped end 262 of the pawl 258 is adapted to be engaged by the hook shaped end 263 of the pawl 264 which latter is rigidly connected to shaft 21. The pawl 264 (Fig. 14) is located behind lever 22 which is rigidly connected to shaft 21. The end of lever 22 carries a roller 25 freely rotatable about the pivot 265, said roller resting on the peripheral surface of the cam disc 253.

*Auxiliary clutch*

In the embodiment illustrated in the drawing, the auxiliary clutch is very similar to the main clutch. Therefore, those parts of the auxiliary clutch which are similar to those of the main clutch are designated with the same reference numerals as the latter, however, with the additional character *a*. The disc 253a (Fig. 9) carries a two arm lever 255a, 256a pivotally mounted on a pivot 254a (Fig. 14). A tension spring 259a has one of its ends connected to the disc 253a while its other end is connected to the arm 255a of the lever 255a, 256a. The lever arm 255a is furthermore provided with an abutment 260a. The lever arm 256a abuts a lever 258a pivotally mounted on a pivot 257a, the end of said lever 258a being provided with a locking nose 262a. Pivotally connected with the pivot stud 20 of the lever 22 is a control member or lever 26 the right end of which (as viewed in Fig. 9) is provided with an oblong hole 266 straddling the pivot 267 (Fig. 14). The lever 26 is provided with laterally protruding abutments 268 and 269 and with a notched end abutment 270. The abutment 270 is adapted to be engaged by a pawl 37 rockable about a pivot 271 on the machine frame, said pawl 37 being held against lever 26 by means of a tension spring 272. The pawl 37 is, furthermore, provided with a lever 274 which is rockable about a pivot 273, connected to an ear of pawl 37, and has two lateral tongues 275 and 292. The tongue 292 is held against the upper edge of pawl 37 by means of a spring 276. To limit the move of the lever 258a there is provided an abutment pin 261a on disc 253a. As will likewise be clear from Fig. 9, the disc 253a substantially representing the driven part of the auxiliary clutch is also provided with an indexing disc 277 provided with two notches 278 adapted to be engaged by a lever 279 which is under the influence of a spring 280 and is tiltably mounted on pivot 271 rigidly connected to the machine frame.

The disc 277 is, furthermore, provided with a pivot 281 having a lever 27 pivotally connected thereto. The lever 27 is pivotally connected with a lever 28 through the pivot 282. The free end of the lever 28 has a nose 283 and is rigidly connected with the shaft 29 journaled in the machine frame. In order to make the contact 5 effective, there is provided a control slide 23 which is adapted by means of a spring 24 to be maintained in its leftward shifted position (Fig. 9). The control slide 23 has oblong bores 6 and 284 by means of which it straddles screws or rivets 7 and 285 the former being connected to the machine frame. The rivet 285 is arranged at the end of the lever 286 which is rigidly connected with the control shaft 21 for calculating so that when said control shaft is actuated, the abutment 8 connected with the control slide 23 will release the lever 5 carrying the movable contact. The lever 287 (Fig. 14) connected to the control shaft 38 for the carriage shift cooperated with the outwardly bent tongue 288 of the slide 23 to close the contacts 2, 5 when a carriage shift operation is initiated.

It may be mentioned that the main clutch is secured against backward turning. To this end, pivot 254 (Fig. 9) is extended forwardly, and cooperates with the nose of lever 289. The lever 289 is freely rockable about the shaft 38 mounted in the machine frame and is biased toward the stud 254 by tension spring 290 which has one end connected to the lever 289, while its other end is connected to an ear 291 slipped upon shaft 14. In this way, spring 290 assures that the lever 289 will be held in its abutting position.

When operation of the main clutch has been initiated, the roll 25 carried by the lever 22 maintains the contact slide 23 in its adjusted position, so that the circuit for the motor remains closed for the duration of one or more calculating cycles.

The auxiliary clutch controls operatively connected with the main clutch controls for the calculating cycle are designed to cause an auxiliary cycle to precede and succeed the calculating cycle proper. To provide for such sequential clutch operation, the control member 26, which is pivotally connected to the lever 22, carries the two abutments 268 and 269. The left abutment 268 of this control member 26 (Fig. 9) releases the hook 262a of the pawl 258a of the auxiliary clutch, when the control lever 22 is turned in clockwise direction with regard to Figs. 9 and 14 as will be described in detail further below. Such movement of lever 22, and thus of main clutch pawl 264 is, however, limited by engagement of abutment 270 of control member 26 with pawl 37 so that pawl 264 remains engaged with pawl 258, and the main clutch remains disengaged. As a result thereof, the abutment 260a engaged the ratchet 16a and rotates the clutch disc 253a in counter-clockwise direction. Rotary movement of the clutch operates the lever 28 through link 27 pivoted at 281 to the control cam 277 at the output side of the auxiliary clutch. Since lever 28 is rigidly connected to shaft 29 extending through the machine, pivoting of lever 28 rocks shaft 29 which in turn actuates a two arm lever 30, 31 which is pivotally mounted at 32 in the frame wall 1 and is adapted to be tilted in clockwise direction by spring 33 when the lever 28 releases the roller 34 connected to the left lever arm 30. It will be appreciated that tilting movement of lever 28 in clockwise direction with regard to Fig. 9 will release roller 34 and thereby also lever 30, 31 so that the latter due to the pull of spring 33 will likewise be tilted in clockwise direction.

The right-hand part of the two arm lever 30, 31 is bent inwardly at a right angle and provided with a hook 35 best visable in Figure 12. This angled part 35 extends to the other side through opening 36 in the frame wall 1. The meaning of the lever 30, 31 with the hook 35 will be explained more in detail later in connection with the multiplying device.

The right abutment 269 provided on the control member 26 arrests the control lever 258a, which forms part of the coupling member of the output side of the auxiliary clutch, after half a revolution has been completed so that the auxiliary clutch is disconnected from the drive. The abutment 269 is moved into the path of movement of nose 262a of lever 258a by release of locking lever 37 from abutment 270 of member 26. The locking lever 37 (Fig. 14) is released through the tilting movement of the lever 28 by nose 283 as a result of which the control member 26 is displaced toward the right to its full extent so that the main clutch is engaged by releasing the hook-shaped end 263 of the pawl 264 from clutch pawl 258 and the rotation of the actuating shaft 17 is started. The lever 37, the front end of which is provided with an abutment in the form of a tongue, has its central upper section provided with an ear to which a pivot 273 is connected. Pivotally connected to the pivot 273 is a member 274 which is held in the position shown in the drawing by means of a tongue 292 located in the rear with regard to the plane of the drawing, and by means of a spring 276. Furthermore, the member 274 is provided with a tongue 275 extending toward the front. The tongue 275 is located about vertically below the pivot 273. The arrangement is such that when the lever 28 is shifted in clockwise direction, its edge 283 abuts the tongue 275 thereby lifting the lever 37 to such an extent that the control member 26 can occupy its outermost right-hand position. When the lever 28 returns to its initial, counter clockwise position, it swings member 274 idly in a clockwise direction without moving lever 37. During the rotation of the actuating shaft, the auxiliary clutch and thus the movement of the shaft 29 remains blocked. Shortly prior to the completion of the movement of the actuating shaft 17, the control lever 22 is moved to its starting position (shown in Fig. 9) by a spring 222 (Fig. 8) rocking a lever 107 fixed to actuating shaft 21 so that the control member 26 shifts leftward. The abutment 269 on member 26 releases the hook 262a of the pawl 258a, and the abutment 260a engages the ratchet 16a. The auxiliary clutch then completes the second half of its cycle position.

In addition to the shafts extending through the entire machine, namely the drive shaft 14 for the carriage shift mechanism, the main actuating shaft 17, the control shaft 21 for addition and subtraction, and the control shaft 29 for multiplication, Fig. 9 shows two additional shafts namely shaft 38 serving as control shaft for initiating the carriage shift operation, and the shaft 39 intended for resetting the various power storing means in the calculating machine. The shaft 38 somewhat protrudes beyond the frame wall of the machine and serves as bearing for a lever 40 the end of which carries a roller 41. Furthermore, connected with the calculating shaft 17 is a cam disc 42 adapted to engage the roller 41 for rocking the lever 40 in clockwise direction as viewed in Fig. 9. This rocking movement is transferred through the link 43 to the lever 44 rigidly connected to the shaft 39. The cam disc 42 is designed to rock shaft 39 toward the end of the addition or subtraction cycle.

*Control center*

Figure 7:
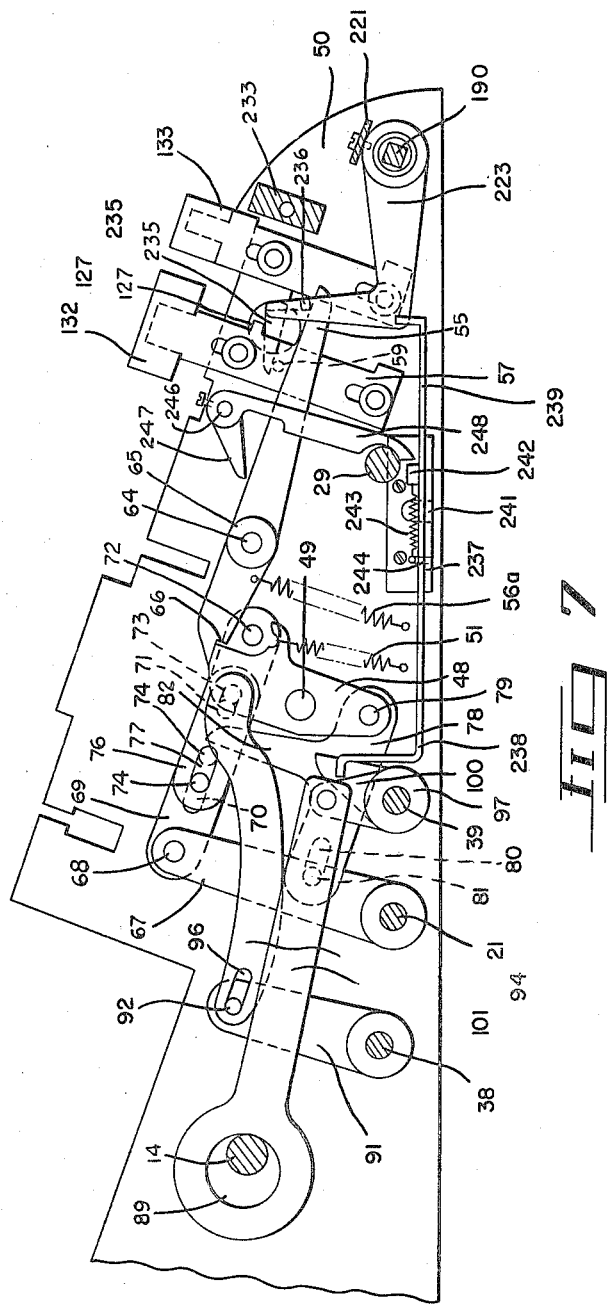
Figure 7 is a view of the inner side of the right frame wall and of the essential elements of the control center.
Figure 8:
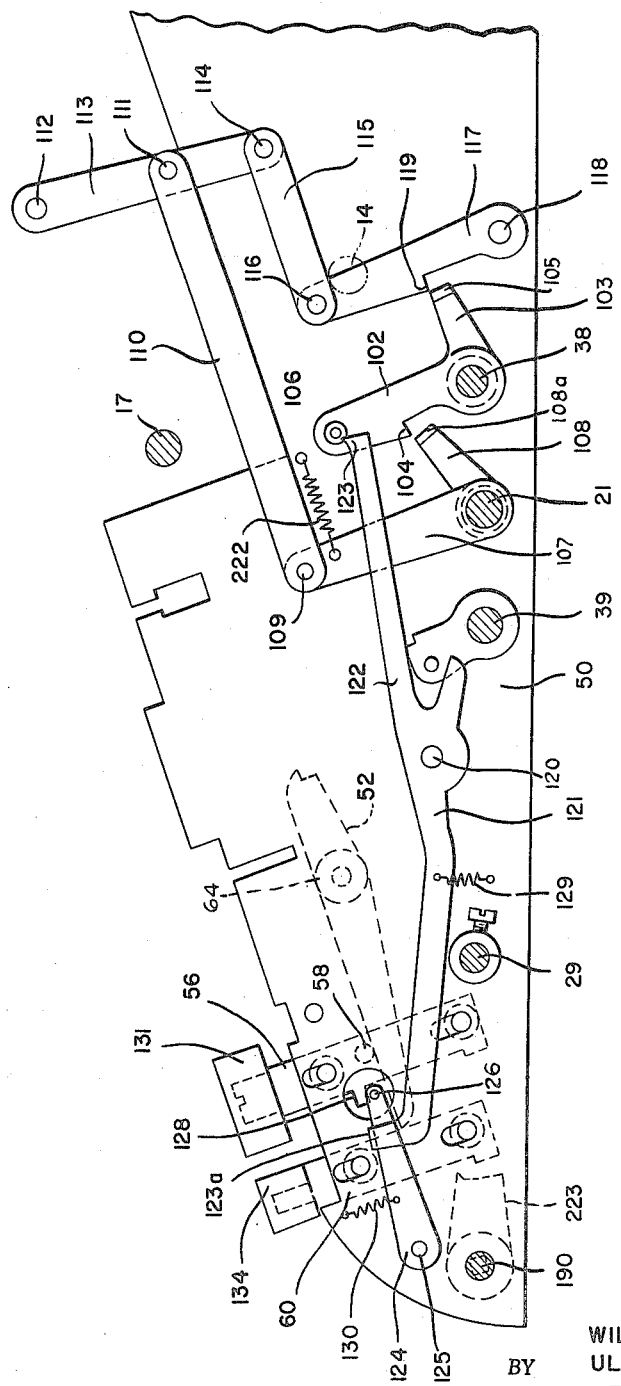
Figure 8 illustrates a view of the outside of the right frame wall while all those parts not necessary for the explanation of the invention have been omitted.
Figure 11:
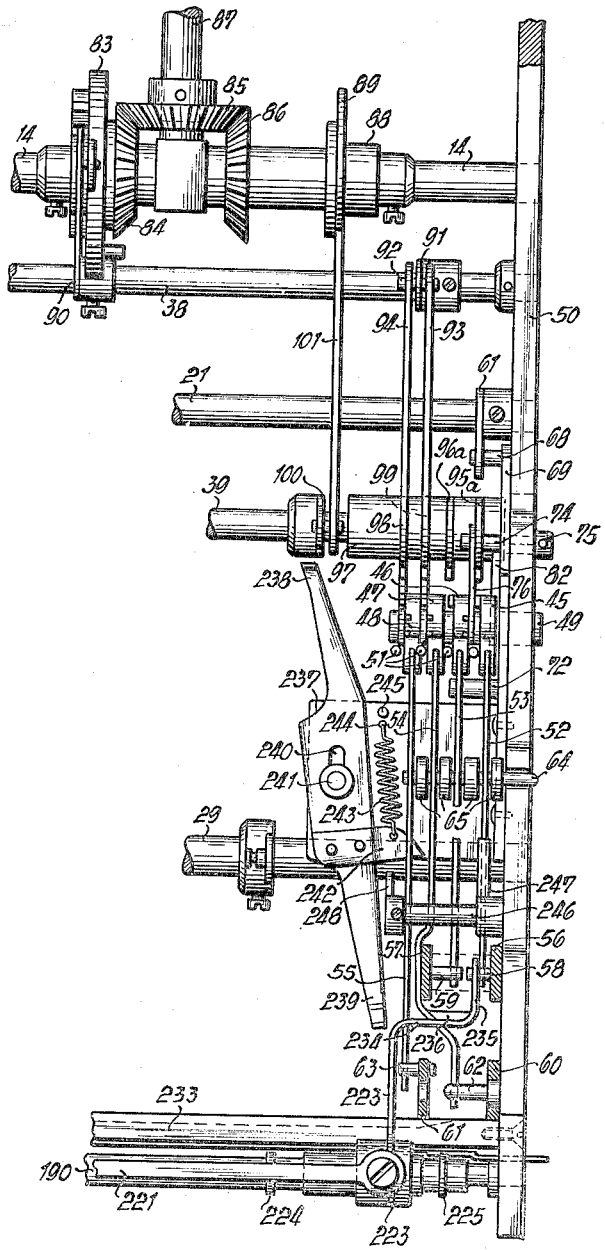
Figure 11 is a top view of the right-hand part of the calculating machine, which part comprises the control center and a portion of the control trains for the multiplying device, all parts not necessary for the understanding of the invention having been omitted.

Figs. 7, 8 and 11, particularly clearly indicate the details of the control center of the calculating machine. As has been mentioned in a more detailed manner in our co-pending patent application Ser. No. 298,806, control members under the action of a strong spring serve to make the various function control trains effective, particularly the control trains for the leftward and rightward carriage shift and for addition and subtraction. The said control members are adapted to be released by corresponding command members. As will be seen from Figs. 7 and 11, the calculating machine comprises a total of four control members 45, 46, 47, 48, which are all of the same construction and are rockably supported by a common shaft 49 on the inside of the right frame wall 50. Each of these control members is provided with a strong spring which springs are all designated with the reference numeral 51. Each of these control members cooperates with a command member. Thus, the control member 45 cooperates with the command member 52, while the control member 46 cooperates with the command member 53. Similarly, the control member 47 cooperates with the command member 54, and the control member 48 cooperates with the command member 55. Each of these command members 52 to 55 is by means of a spring 56a held in abutment with a corresponding control member (Fig. 7).

As will be clearly evident from Figs. 7, 8, and 11, the calculating machine comprises two key stems 56, 57 which are movable in vertical direction. The key stem 56 is provided with a pin 58 which is within the range of the command member of the command lever 52. A corresponding somewhat longer pin 59 is rigidly connected with the key stem 57 which is located above the command member 53. The key stem 56 carries the addition key 131 and the key stem 57 carries the subtraction key 132.

In similar manner, two further key stems 60 and 61 are vertically movable in the calculating machine, which key stems are adapted by lateral pins 62 and 63 to act upon the command levers 54, 55. The key stem 60 carries the function control key 134 for the rightward carriage shift, while the key stem 61 carries the function control key 133 for the leftward carriage shift.

The command members 53 to 55 (Figs. 11 and 15) are pivotally supported by a shaft 64 common to them, and are held in their lateral positions by spacers 65. The end of the said command levers 53 to 55 which are operatively connected to the control members are furthermore provided with a cut-out or abutment 66 (Fig. 7). From Figs. 7, 8 and 15 it will also be seen that, when depressing one of the four function control keys, the command levers 52 to 55 are adapted to be rocked in clockwise direction (Figs. 7 and 15) against the thrust of the springs 56a, as a result of which the control members 45 to 48 may likewise be rocked in clockwise direction due to the effect of the tension springs 51. The control members 45 to 48, as will be explained in detail later, are adapted to actuate the control trains for addition and subtraction, carriage shift, or for pre-setting other functions.

In order, when simultaneously depressing the addition and subtraction keys, to prevent the two corresponding commands from being entered simultaneously, it is necessary to provide a locking arrangement between the said two keys, which locking arrangement is generally known and thus has not been shown in the drawing. A similar locking arrangement must be provided between the two key stems for leftward and rightward carriage shift, which locking arrangement has likewise not been illustrated in the drawing.

The following devices have been provided for transferring the commands imposed upon the central members to function control trains of the calculating machine: The control shaft 21 which extends through the machine from left to right and which, as illustrated in connection with Figs. 9 and 14 serves to rock the lever 22 and thus to make effective the auxiliary and main clutch in sequence and close the contact 5 for the motor, is provided at the right-hand end with a lever 67 as shown in Figs. 7, 11 and 15. The upper end of this lever 67 is provided with a pin 68 having pivotally connected thereto a control link 69. This link 69 is provided with an oblong slot 70 and a further oblong slot 71 (Figs. 7 and 15) while its front end has a pin 72 which protrudes into the range of movement of the two control members 45 and 46. The oblong slot 71 merely serves for guiding the control link 69 on a bolt 73. Extending through the slot 70 and through the right frame wall of the machine is a bolt 74 which is connected with the lever 75 (Fig. 11) which controls the reversing train for the addition and subtraction spool gears. With the control member 46 there is furthermore connected a control link 76 provided with a slot 77 through which the pin or bolt 74 likewise extends. A third control link 78 (Figs. 7 and 15) is pivotally connected to the bolt 79 at the lower end of the control member 45. This control link is provided with a slot 80 by means of which it straddles a bolt 81 connected to the frame wall 50. Slot 80 and bolt 81 merely serve to maintain the control link 78 in its respective angular position. The link 78 has an upward extension formed by an abutment 82 which extends to the level of the bolt 74 of the control lever 75.

As has already been mentioned, the two control links 76 and 78 control the adjustment of the machine for addition or subtraction. As will be evident from Figs. 7 and 15, when actuating the addition key, the control member 45 is turned in clockwise direction with regard to Figure 7 as the result of which the bolt 74 by means of the abutment 82 of the control member 78 moves into the rearward position shown in solid lines. When resetting the control member 45, the abutment 82 returns to its starting position, whereas the bolt 74 remains in the position into which it has been moved. If now the subtraction key carried by stem 57 is depressed, the command member 53 of the control member 46 is released so that through the control member 76, the bolt 74 is moved into the front position illustrated in Figure 7 in dash lines.

The control and driving mechanism for shifting the carriage shift mechanism will be evident from Figure 11. The reference numeral 14 indicates the driving shaft for the carriage shift mechanism, which driving shaft is also visible in Figure 9 and is connected with a bevel gear system 84, 85 and 86 through a clutch 83. The bevel gear 85 is rigidly connected to a shaft 87 which extends to the driving wheels for the leftward and rightward carriage shift. Connected with the bevel gear 86 is a sleeve 88 having connected thereto an eccentric 89. It should be noted in this connection that the bevel gear system 84, 85, 86 is not a control device for left and right-hand carriage shift. The relatively strong drive shaft 14 for the carriage shift, which shaft is journalled in the left-hand and right-hand frame wall is merely made use of at this point for supporting other parts. The hub portion located between the bevel gears 84 and 86 (not designated with a reference numeral in Fig. 11) serves as journal and support for the shaft 87 and the bevel gear 85. The second bevel gear 86 on the sleeve 88 serves for driving the eccentric 89. Thus, the eccentric 89 rotates in a direction opposite to the direction of rotation of the bevel gear 84 which fact, however, is of no importance for the operation of the construction. If shaft 87 and bevel gear 85 would be journalled in the machine frame, the bevel gear 86 could be omitted and the sleeve 86 could be extended toward the left up to the driven part 83 of the clutch. A control lever 90 connected to the control shaft 38 serves for releasing the clutch 83. The connection of the control shaft 38 with the control center is effected by a lever 91 (Figs. 7, 11 and 15), the upper end of which is provided with a bolt 92 extending to both sides. The connection of the lever 91 with the control members 47 and 48 of the control center is effected by two links 93 and 94. The link 93 is pivotally connected with the control member 47, while the link 94 is pivotally connected with the control member 48. The two links 93 and 94 are each provided with an oblong hole 95 and 96 (Figs. 7 and 15) by means of which they straddle the bolt 92 of the lever 91. It will be obvious from Figures 8 and 11, that the key stems 61 and 60 for leftward and rightward carriage shift respectively by rocking the command levers 55 and 54, release the control members 48 and 47 for movement into their rocked positions so that through the control trains 94 and 93 respectively, the lever 91, the shaft 38, and the lever 90, the carriage shift clutch 83 is made effective.

As has been described in detail in our above mentioned co-pending patent application Ser. No. 298,806 a separate resetting mechanism is provided for the two groups of control members 45, 46, and 47, 48 respectively of the control center. The same arrangement is provided in the calculating machine according to the present invention. Thus, for resetting the control members 45 and 46 for addition and subtraction, there is provided a resetting shaft 39 which is illustrated in Figure 9 and extends through the calculating machine from left to right. The right-hand end of this resetting shaft 39 is provided with two control cams 95a and 96a which are arranged within the path of the control members 45 and 46 to rock these members and load the springs 51 (Figs. 7 and 15) connected with these control members when shaft 39 is rocked, and to move the upper edges of these control members behind the abutments 66 of the corresponding command members 52 and 53. A similar resetting mechanism is also provided for the control members 47 and 48 pertaining to the control system for the leftward and rightward carriage shift. To this end, there is mounted on the resetting shaft 39a sleeve 97 (Figs. 11 and 15) which is likewise provided with two control cams 98 and 99 (in Figure 11 arranged below the links 93 and 94) for resetting the control members 47 and 48. A lever 100 (Figs. 7 and 15) and a connecting rod 101 connect the sleeve 97 with the eccentric 89 on the sleeve 88 which is freely rotatably mounted on the carriage shift shaft 24.

As has been mentioned, the two function control keys for addition and subtraction and for leftward and rightward carriage shift respectively are locked with regard to each other in order to prevent a simultaneous transfer to the respective commands one of which excludes the other, which would otherwise block the machine. With the arrangement of the control center as described, it would, however, be possible simultaneously to transfer to the machine an addition or subtraction command and a carriage shift command which likewise would block the machine. For this reason, the calculating machine is additionally provided with a locking mechanism which is particularly clearly visible in Figure 8. Figure 8 shows the outside of the right-hand frame wall 50 with a number of shafts extending up to this side of the frame wall. Particularly, the control shaft 21 initiating an addition or subtraction cycle, and the control shaft 38 for initiating the carriage shift are extended beyond the right-hand side of the frame wall 50 and are provided with interlocking means to effect mutual blocking. To this end, the control shaft 38 is provided with a bell crank lever 102, 103 the lever arm 102 of which is provided with a locking nose 104, while the lever arm 103 is provided with a bent tongue 105. The lever arm 102 is additionally provided with a pin 106. The control shaft 21 for the main clutch is provided with a similar bell crank lever 107, 108. The somewhat longer lever arm 107 is connected by pivot 109 with a link 110 which through the pivot 111 is pivotally connected with a lever 113, tiltably mounted on the machine frame at 112. The lever 113, which is extended downwardly and by the above mentioned spring 222 is urged in counter-clockwise direction has its lower end provided with a pivot 114. Pivotally connected to this pivot 114 is a link 115 which in its turn is pivotally connected with the pivot 116 at the upper end of the lever 117. The lever 117 is pivotally mounted on the side wall 50 at 118 and, furthermore, is provided with a locking nose 119. Similar to the lever arm 103, also the lever arm 108 is provided with a bent tongue 108a.

As will be clear from Figure 8, the two bent tongues 105 and 108a occupy such a position with regard to the respective adjacent locking nose 119, 104 that, if one of the two control shafts 21 or 38 is turned counterclockwise to a small extent, the respective other control shaft is locked by the movement of the control shaft turned first so that one control train only can be actuated at a time. If the shaft 21 has been turned counter-clockwise by a small angle, the locking nose 119 moves in front of the tongue 105 and blocks the shaft 38. If, however, the control shaft 38 has been turned counter-clockwise, the nose 104 moves in front of the tongue 108a and blocks the shaft 21.

Since simultaneous depression of an addition or subtraction key and of a carriage shift key is possible and may cause the edges of tongues 105 or 108a to engage the front ends of locking noses 119 or 104, respectively, and thus block the machine, there is provided a second device in order to prevent such accident. To this end, a lever 121, 122 is pivotally mounted on a pivot 120. The right-hand arm 122 of lever 121, 122 carries a locking nose 123 which is in direct proximity to the pivot 106 arranged at the upper end of the lever 102. The left arm 121 of this lever extends over a lever 124 by means of a bent tongue 123a. The lever 124 is pivotally mounted on a pivot 125 on the frame wall 50 and is provided with a pin 126 which extends through an opening of the frame wall into the interior of the machine. The pin 126 may be actuated by two extensions 127, 128 (Figs. 7 and 8) provided on the key stems 56 and 57 for addition and subtraction. The lever 121, 122 is urged from the position shown in Figure 8 in counter-clockwise direction by means of a tension spring 129. A similar spring 130 is connected to the intermediate lever 124 and tends to move the same counter-clockwise and to hold levers 121, 122 clockwise.

The operation of the device described so far will be clear from Figure 8. When one of the function control keys 131 or 132 for addition and subtraction is depressed, the lever 124 is rocked in clockwise direction by the extensions 127, 128 of the key stems and the pin 126 on the lever 124. As a result thereof, due to the thrust of the spring 129, the lever 121, 122 is tilted in counter-clockwise direction. Consequently, the locking nose 123 moves in front of the pivot 106 so that the control shaft 38 for the carriage shifting movement is blocked directly by the function control keys for calculating. Consequently, when simultaneously entering a command for addition and subtraction and for carriage shift, the carriage shift command is temporarily stored, while the calculating command is carried out. After the addition or subtraction cycle has been executed, the carriage shift command is executed. In other words, the machine according to the present invention successively carries out different types of commands such as addition or subtraction and carriage shift commands entered into the machine simultaneously, without causing the machine to be blocked.

*Multiplying mechanism*

The multiplying mechanism, which will now be described, represents a device which comprises a key bank including the numerals 1 to 9. The arrangement is such that upon depression of the selector keys 1 to 5, a corresponding number of actuator cycles is automatically effected and thereafter the carriage is moved toward the right by one indexing step. Upon depression of the selector keys corresponding to the numerals 6 to 9, the multiplying process is carried out by a shortened process, in other words, the machine carries out a number of subtractive cycles corresponding to the complementary value of the entered number, and after the subsequently effected rightward shift of the carriage, a corrective cycle addition is effected.

The multiplying device comprises the following parts: First of all, there is provided a key bank illustrated in Figs. 1–5 which substantially comprises a base plate 135 and a frame 136 connected with this base plate. In case of needed repair, the key bank 135, 136 can easily be removed from the calculating machine so that the individual control elements, which are provided particularly on the inner wall of the left frame plate 1, are easily accessible. Key stems 137 are vertically slidably mounted in guiding means of the key bank 135, 136 against the thrust of the springs 138. Figure 1 illustrates only one of these resetting springs 138. One side of the key stem 137 is provided with abutment means 139 (Fig. 3) while the other side of the key stems 137 is provided with notches 140 and 141 arranged one above the other. These notches 140 and 141 can be engaged by the angled end of a flap 142 which is tiltably journalled in the two small slides of the frame 136. The flap 142 is approximately at this central portion provided with a pin 143 which extends to the other side of the key bank. On that side of the key bank which is located opposite the flap 142, there is provided a sensing slide 144. By means of two oblong holes 145 and two corresponding bolts 147 provided with washers 146, the sensing slide 144 is slidably mounted in longitudinal direction of the key bank on columns 148, 149 (Fig. 1) which have a square cross section and extend through the key bank from the top to the bottom thereof. The sensing slide 144 is under the influence of a tension spring 149a and is furthermore provided with a bolt 150. By means of this bolt 150, as will be described in detail later, the sensing slide engages a corresponding recess 177 of a lever 174, 176 (Fig. 6) which carries the control segment of the multiplying device. The sensing slide furthermore has a total of nine abutments 151, 152 . . . 159 (Fig. 1) which cooperate with the abutments 139 of the key stems 137. A slanted control edge 160 on sensing slide 144 cooperates with the pin 143 on locking flap 142 to maintain the locking flap in an ineffective, outwardly rocked, position when the sensing slide 144 is in normal, leftmost position (Fig. 1), and thus permit each of the keys carrying the numerals 1 to 9 to be depressed (Fig. 3). In the proximity of the two lower longitudinal edges of the key bank, there are arranged shafts 161 and 162 respectively extending in the longitudinal direction of the key bank. The shaft 161 is journalled in the frame 136 at 163 and 164 (Fig. 1) and is provided with a flap consisting of the two parts 165, 166. The two parts 165 and 166 represent a single flap with two ears rigidly interconnected by their hub portions. The key stems of the number group 1 to 5 are adapted to actuate the flap 165, 166 as a result of which the flap is rocked into the position shown in Figures 1 and 4. The rocking movement of the flap 165, 166 is transferred to a tongue 167 (Fig. 1) which, however, is not connected with the key bank but pertains to a control member 193 (Fig. 6) slidably and tiltably mounted on the side wall of the machine. It will be appreciated that tongue 167 is located below the end of the flap portion 166 or 169 so that a tilting movement of flap 165, 166 or 169 brings about a downward movement of tongue 167. The shaft 162 is rockably journalled in the front and rear wall of the frame and is provided with a flap 168 adapted by means of the selector keys 6 to 9 to be rocked downwardly into the position illustrated in dash lines in Figure 1 and illustrated by solid lines in Figure 5. Furthermore connected with the shaft 162 is a short flap member 169 (Fig. 1) which is likewise adapted to act upon the tongue 167 when the shaft 162 is rotated.

The shaft 162 protrudes somewhat beyond the front end of the frame 136. This protruding end is provided with a lever 170 the end of which carries a pin 171. A notch 172 provided in the pin 171 receives one end of a tension spring 229, while the stud 172a (Figs. 1, 4 and 12) on the lever 170 receives one end of a tension spring 230. When one of the selector keys of the number group 6 to 9 is depressed and thus the shaft 162 is turned, the lever 170 with its pin 171 is rocked counter-clockwise (Fig. 5). As will be explained later, the control lever 170 is intended to adjust a control train to effect a shortened multiplication.

As will be seen from Figure 3, in the normal or ineffective position of the sensing slide 144, the flap 142 occupies its outwardly tilted position so that each of the keys 1 to 9 may be depressed. As will be described later, subsequently to the depression of a selector key, the sensing slide 144 moves until one of the abutments 151 to 159 contacts the abutment 139 on the depressed key stem 137. Due to this adjusting movement of the sensing slide 144, the flap 142 moves into a position illustrated in Figures 4 and 5. The angled end of the flap 142 then engages the lower notch 141 of those key stems which have not been depressed, and the upper notch 140 of that key stem which has been depressed. In this way, the depressed key and also the non-depressed keys are locked in their respective positions until the multiplying process has been completed.

The control elements cooperating with the key bank for the multiplying device according to Figures 1 to 5 are primarily visible in Fig. 6. Thus, a two arm lever 174, 176 is rockably mounted on a bolt 173 provided on the frame 1. The lower arm 174 of the lever 174, 176 carries the control segment 175 of the multiplying device, while the upper arm 176 of the lever 174, 176 carries a notch 177. After the key bank provided for the multiplying device has been installed, the notch 177 is engaged by the bolt 150 (Figs. 1-5) connected to the sensing slide 144. The locking of the lever 174, 176 in its normal or starting position, which lever carries the control segment 175, is effected by a two arm lever 178, 179. This two arm lever is rockably mounted on a pivot 180 on the frame wall 1 and has its rotation in clockwise direction as viewed in Fig. 6 limited by an abutment pin 181. The lever arm 178 of the lever 178, 179 is engaged by one end of the spring 182 the other end of which is connected to a lever 183. This lever 183 is pivotally mounted on a pivot 184 likewise provided on the frame wall. The lever 183 has an arch-shaped extension 185 which ends in a tongue 186 perpendicular to the plane of the drawing. The lever 183 is, furthermore, provided with a notched shoulder 187 adapted to be engaged by a lateral tongue 188 of a longer lever 189. The lever 189 is rigidly connected to a shaft 190 of a square cross-section which shaft is arranged in the neighborhood of the front edge of the calculating machine and extends from the left frame wall 1 to the right frame wall 50 and is rotatably mounted in said walls. The lever 189 is, furthermore, under the influence of a strong spring 191 which is connected to the frame wall 1 at 192. The inner side of the frame wall is provided with a control element 193 having an elongated hole 194 embracing a screw 195 connected to the frame wall 1 and permitting vertical displacement and pivotal movement of control member 193. A tension spring 196 yieldably maintains the control element 193 in the upper counter-clockwise position illustrated in the drawing. Near the lower end of the control element 193, said element 193 is provided with a notch 198 embracing the angle end 186 of the lever 185, 183. Furthermore, the lower end of the control member 193 is provided with the bent tongue 167 mentioned above in connection with Figure 1. The tongue 167 is provided with a screw or rivet 199 which is straddled by an oblong hole 201 in a long link 200. The rear end of the link 200 is tiltable about a screw bolt 202 connected with the lever 203 which in its turn is rigidly connected to the shaft 38. As previously mentioned, the shaft 38 represents the control shaft for the carriage shift movement.

A lever 204 carrying a pawl 205 is connected with the shaft 39 provided for resetting the control members for addition and subtraction located in the control center. A spring 206 connected to the pawl 205 and the hub of lever 204 urges the pawl counter-clockwise to limit against the hub. As will be explained later, the pawl 205 is intended for resetting the control segment 175.

Pivotally mounted on the shaft 207 is a two arm lever 208, 209. The end of arm 209 is designed as a locking pawl 210, while the end of the lever arm 208 is provided with a slant surface 211. A tension spring 212 is connected to the lever arm 208 which maintains the lever in contact with a bolt 213. The bolt 213 is connected to the lever 214 which is non-rotatably mounted on shaft 29 adapted to be turned in counter-clockwise direction with regard to Figure 6. A further lever 215 is rockably mounted on the bolt 216 on frame plate 1. This lever 215 carries a pin 217 and a pin 218 adapted to act upon the lever 189. By means of the hook-shaped bent part 219, the lever 215 is adapted to act upon the lever arm 178 of the two arm lever 178, 179. The lever arm 215 is, furthermore, provided with an arm 220 by means of which it is in operative engagement with the control segment 175.

A control train 221 is slidably mounted on the square shaft 190 (Figs. 6, 8, 10) which train is provided with an abutment pin 227. Fig. 6 also shows the hook 35 of the two arm lever 30, 31 shown in Figure 9.

Figure 12 illustrates the control train leading from the multiplying device to the control center of the machine, as seen from the front side of the machine. The reference numeral 190 designates the square shaft which is rotatably journalled in the two frame walls 1 and 50. The shaft 190 is at its left end connected with the lever 189 described in connection with Figure 6. Near the right end of the shaft 190, there is provided a lever 223 which is movable in the longitudinal direction of the shaft 190. The movement of the lever 223 toward the left is limited by an abutment 224 while the movement of the lever 223 toward the right is limited by an abutment 225. The lever 223 is furthermore engaged by the control train 221 the left end of which is provided with a bent tongue 226 slidably engaging square shaft 190 and serving as a guide. The control train 221 is provided with two outwardly extending pins 227 and 228. The pin 227 serves as abutment for the pin 171 of the lever 170 which latter is connected to the shaft 162 of the key bank of the multiplying device. Connected to the pin 228 is the spring 229 the other end of which is connected to the pin 171 of the lever 170. The tension spring 230 has one end connected to the stud 172a of the lever 170 and has its other end connected to a pin 231 on the rail 233. The pin 231 is fixed to the connecting rail 233 extending from wall 1 to frame 50. Fig. 12, furthermore, illustrates the hook 35 which is connected to the two arm lever 30, 31 (Fig. 9) which hook retains the pin 171 of the lever 170 during the shortened calculation until the carriage shift movement starts.

Figure 10:
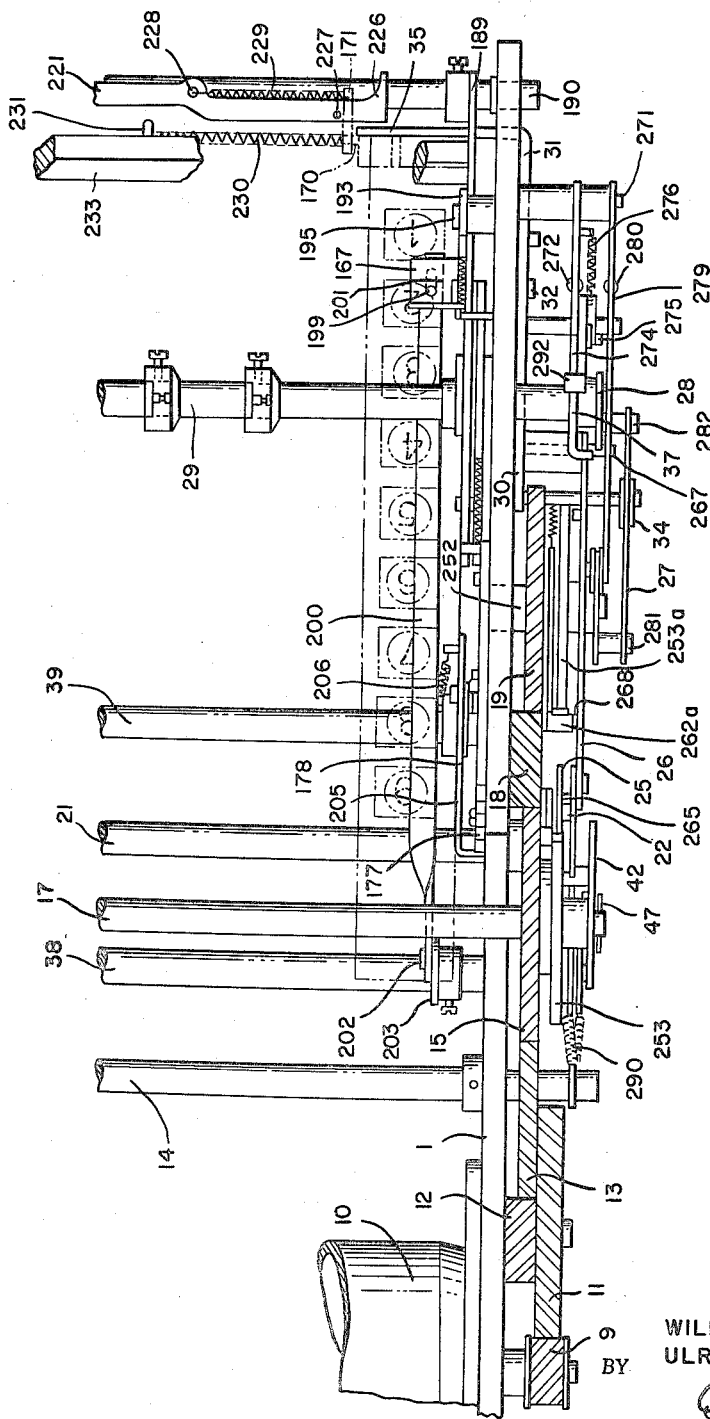
Figure 10 is a top view of that part of the multiplying device which is located at the front and left side of the calculating machine.

Figs. 10 and 11 illustrate a top view of the control train which extends from the multiplying device to the control center. The lever 223 (Fig. 11) provided at the end of the control train 221 which extends through the machine from left to right, has its end provided with two rectangularly bent parts 234, 235. Connected to the part 234 is a downwardly extending tongue 236 adapted to act upon the command member 54 for the rightward carriage shift. The lever part 235 is, in the position shown in the drawing, located above the pin 58 connected to the key stem 56. It will be seen that when moving the lever 223 toward the left, the lever end 235 is adapted to move above the pin 59 connected to the key stem 57, whereas the downwardly extending tongue 236 remains above the command member 54. Therefore, by means of this movement, it is possible to enter a subtraction command instead of an addition command, while the carriage adjustment toward the right, which follows the calculating cycle, is maintained.

Inasmuch as, when carrying out a short-cut calculation, a corrective cycle has to follow the carriage shift, the following auxiliary mechanism is provided. Mounted on an angled metal sheet 237 (Figs. 11, 7) connected with the frame wall 50 is a two arm lever 238, 239 which by means of an oblong hole 240 is rockable about a bolt 241 and is movable in its longitudinal direction. The lever arm 239 is provided with an abutment 242 to which is connected a spring 243. The spring 243 is connected with the angle 237 at 244. Furthermore, the angle 237 is provided with an abutment 245 for the lever 238, 239. The end of the lever arm 239 is held in engagement with the lever 223 by means of the spring 243. The end of the other lever arm 238 is located on the neighborhood of the lever 100 on the sleeve 97 or in the neighborhood of the eccentric 101. Furthermore, above the command members pertaining to the control center, there is located a shaft 246 provided with a lever arm 247 and a lever arm 248 (Figs. 7 and 11). The downwardly extending lever 248 arranged to engage the shaft 29 is located within the range of the abutment 242. The somewhat shorter lever 247 has its end directly located above the command member 52 for addition.

The lever 238 and 239 and the elements 247 to 248 have the following functions: In carrying out a short-cut calculation, the function lever 223 is moved toward the left with regard to Figure 11, and carries along the lever 238, 239 so that the end of the lever arm 238 will come into the range of the eccentric rod 101. This position will be maintained until, subsequent to the subtractive cycles, the carriage moves toward the right. During this carriage shifting movement, the eccentric 89 resets the control members 47 and 48 of the control center. During this operation, the end of the eccentric rod 101 moves the two arm lever 238, 239 in longitudinal direction as a result of which through the intervention of the control element 242 and the elements 248, 246, 247 the command member 52 for addition is actuated. This command is stored until the carriage shifting movement has been completed. Subsequently, the corrective addition cycle required when carrying out a short-cut calculation is effected.

From the above it will be clear that with the calculating machine according to the invention provided with a control center, the timed sequence in which individual function control commands are entered is immaterial. When simultaneously entering an addition or subtraction and a carriage shift command, the machine carries out two commands in the sequence addition or subtraction carriage shift without any disorder. If, during the execution of the carriage shift command, an addition or subtraction command is entered, this operation will be carried out after completion of the carriage shift cycle. In view of this feature of the machine, the multiplying device can be materially simplified.

*Operation of the multiplying device*

If, for instance, the selector key with the numeral 3 is depressed, the flap 165, 166 is first tilted which flap presses upon the tongue 167 (Fig. 6) of the control member 193 and through the notched nose 198 transfers this pressure to the tongue 186 of the lever 183, 185. During this operation, the interlock 187, 188 is released so that the lever 189 is tilted downwardly due to the pull of the spring 191. As a result thereof, the square shaft 190 turns clockwise and transfers the impulse conveyed thereto to the command member 52 for addition through lever 223 and also to the command member 54 for rightward carriage shift. Due to the rocking movement of the lever 183, 185 and of the lever 189, the two levers 178, 179 and 215, 220 are rocked in counter-clockwise direction so that the lever 174, 176 carrying the control segment 175 can move in counter-clockwise direction. More specifically, when the lever 189 is rocked clockwise (Fig. 6) lever 215 is rotated counterclockwise by engagement of lever 189 with pin 217 so that angled portions 219 of lever 215 release lever 178, 179 for counterclockwise movement by its spring 182. Such counterclockwise movement of lever 178, 179 releases lever 174, 176. The lever 174, 176 then rotates counterclockwise (Fig. 6) by virtue of its connection to spring-urged slide 144 (Fig. 1), to an angular extent corresponding to the depressed selector key. Resetting of the control segment 175 is effected by means of pawl 205 and locking pawl 210, the gear segment 175 resting against the lever arm 220. With the last resetting stroke of the pawl, the lever 189 moves into its starting position, and the two-arm safety lever 178, 179 has its right-hand end resting against the lever arm 176 of the resetting segment.

By means of the pin 150 (Figs. 3–5) of the sensing slide 144, which pin engages the slot 177 (Fig. 6) of the lever 174, 176, the spring 149a between the key bank and the sensing slide is effective to move the sensing slide forward three increments until abutment 153 on the slide abuts the abutment 139 of the selector key 3. The control segment 175 is thus rocked as far as the sensing slide and the depressed selector key will permit. The addition command entered into the machine effected by release of lever 189 brings about the closure of the circuit for the motor and also makes effective the auxiliary clutch 16a. This clutch, as mentioned before, now carries out half a revolution as the result of which the shaft 29 carries out a rocking movement to the right (Fig. 9). This rocking movement is also conveyed to the lever 214 which is rocked in counterclockwise direction by a certain distance (Fig. 6). In view of this rocking movement, the two arm lever 208, 209 is released and urged by spring 212 to engage the teeth of the control segment 175. Furthermore, the upper end of the lever 214 engages the pin 196a connected to the control member 193 so that the control member 193 is rocked in clockwise direction. As a result thereof, the nose 198 disengages the tongue 186 of the lever 183, 185. Hence, lever 183, 185 is free to return to locking position even though the multiplication key and control member 193 is depressed. During this operation the pin 193a (Fig. 6) in the side wall 1 serves as abutment. The oblong hole 201 in the link 200 makes possible the return of the control member 193 to its starting position even after the lever 183, 185 has returned to its reset position.

Shortly before the auxiliary clutch 16a has completed half a revolution, the main clutch 16 for calculating is released as mentioned above and the machine now carries out a number of calculating cycles. Each rotation of the shaft 17 causes an oscillating movement of the resetting shaft 39 through the intervention of the cam disc 42 and the lever 40. This oscillating movement causes the control pawl 205 to perform a rocking movement in counter-clockwise direction (Fig. 6) and resets the indexing segment 175 by one tooth. The respectively obtained position of the indexing segment 175 is maintained by the locking pawl 210. With the last resetting movement of the indexing pawl 205, the lever 189 is lifted by lever 220, 215 and pin 217 to such extent that the nose 187 provided on the lever 183 moves underneath the tongue 188 of the lever 189. Simultaneously, the lever 178, 179 is moved into its clockwise tilted position, so that the lever arm 179 rests against the lever arm 176 of the indexing segment 175 and locks the same in its rest position. Shortly prior to the completion of the last revolution of the actuating shaft, the auxiliary clutch again becomes effective as mentioned above, so that the shaft 29 again returns to its starting position. As a result thereof, the indexing pawl 210 is disengaged from the indexing segment 175. The return of the lever 214 into its starting position also makes possible the return of the control member 193 to its starting position so that the multiplying device is ready for a new multiplication.

In connection with the device described, it should be noted that, while a carriage shift command is entered into the machine, transfer of a control command originating with the multiplying device to the control center must be prevented. In order to effect a corresponding safeguard, the lever 203 is connected with the control shaft 38 for carriage shift. The lever 203 is connected through the link 200 with the tongue 167 of the control member 193. When the machine has received a carriage shift command, the shaft 38 has been rotated in counter-clockwise direction by a certain angle (Fig. 6). Due to this rotation, the nose 198 of the control member 193 is likewise moved toward the left to such an extent that it is located outside the reach of the tongue 186 connected with the lever 183, 185. The lever 183, 185 thus cannot be actuated by the selector keys of the multiplying device.

When carrying out a short-cut calculation, for instance, when depressing the key with the numeral 7, the key pressure is conveyed through flap 168, shaft 162 and the short flap 169 likewise to the tongue 167 of the control member 193. Simultaneously, also the lever 170 connected to the shaft 162 is rocked counterclockwise from the Fig. 4 to the Fig. 5 position so that by means of spring 229 and control train 221 the lever 223 is moved into its leftward adjusted position (Figs. 11 and 12). This adjusting movement is practically completed when the lever 189 is released by the lever 185, 183, and the square shaft 190 conveys the command to the command members 53, 54. The further functions of the machine are quite analogous to those involved with a non-short-cut calculation. First of all, the auxiliary clutch turns shaft 29 in clockwise direction as viewed in Figure 9. As a result thereof, the lever 28 releases the roller 34 so that the two arm lever 30, 31 under the influence of the spring 33 is rocked in clockwise direction. The hook 35 connected to the lever arm 31 is thus in a position to extend over the pin 171 of the lever 170 and to maintain the lever 170 and thus the control train 221 in the leftward moved position. This is of importance in order that during the subsequent calculating cycles, the lever 238, 239 (Fig. 11) remains in its rocked position. The lever 170 and thus the control train 221 is released by lifting hook 35, after completion of the calculating cycles, when the two arm lever 30, 31, is rocked by the lever 28 (Fig. 9) on the return movement of the auxiliary clutch. The purpose of the just described lock will best be understood from the following consideration. When carrying out a short-cut calculation, it is indispensable prior to depressing the selector keys 6 to 9 to carry out certain preparatory steps which must have been completed prior to the starting of the machine in order to avoid faulty results. On the other hand, the operative position for the short-cut calculation must be maintained until the last working operation, in this instance the addition correcting command can safely be initiated. This last mentioned requirement will be met by the provided lock. Therefore, the short-cut calculation requires that following the depression of one of the selector keys 6 to 9, first the control train 221 be moved toward the left with regard to Fig. 11 which is effected through the intervention of lever 170. As a result of said leftward movement of control train 221, lever 223 occupies a position in which it releases a subtraction command instead of an addition command. The process is, of course, reversed when carrying out a negative multiplication. Following the initiation of the auxiliary clutch, the thus occupied position of the lever 170 is fixed by spring 133 through the intervention of hook 35. Spring 33 is connected to lever 31. In this connection, it may be added that at the end of the striking-in stroke of one of the selector keys 6 to 9, a subtraction command as well as a carriage shift command was conveyed through the command levers 53, 55 (Fig. 11) respectively so that first the calculating command, and subsequently the carriage shift command will be carried out. However, the gear segment 175 returns the mechanism for short-cut calculation to its starting position already at the end of the calculating movement, and the very selector key, which was depressed, returns to its starting position. If, at this time, the control train 221 would again return to its right-hand position (Fig. 11), also the lever 238, 239 would occupy its starting position. The result of such operation would be that only the carriage shift command will be carried out by the calculating machine, the subsequent corrective addition cycle would not be carried out. The said last mentioned command is conveyed to the control element 247 through the intervention of the eccentric rod 101, lever 100, two-arm lever 238, 239 and control element 242 and lever 248. It will, therefore, be clear that the control train 221 should remain in its left-hand position as long as possible while the carriage shift is being carried out. When the control train 221, 223 is in its rest position, the end of lever 238 cannot be engaged any longer by the control lever 100 and by the eccentric rod 101. In the course of the return movement of the auxiliary clutch, the carriage shift command has been executed so that the lever 238, 239 (Fig. 11) is moved by the eccentric rod in axial direction for initiating the corrective addition command. As already mentioned, this corrective command is transferred by the control member 242 to the elements 248, 246, 247 and from there to the command member 52 and thus is carried out subsequent to the carriage shifting movement.

When depressing one of the keys 6 to 9, the flap 168, fixedly connected to the shaft 162, and thus the lever 170 which is likewise fixed to the shaft 162 are tilted. As will be clear from Fig. 12, a spring 229 is stretched between the stud 171 of the lever 170 and the stud 228 of the control train 221 so that when the lever 170 is shifted in counterclockwise direction with regard to Fig. 12, the control train 221 is carried along. This movement is completed for all practical purposes when the control member 193 is pulled downwardly through the intervention of flap 169 connected to shaft 162 and tongue 167 to such an extent that the lever 183, 185 is turned by engagement of edge 198 and tongue 186 so that said lever 183, 185 releases the lever 189 at 187, 188. The shifting over of the lever 223 is thus completed before the initiation of the calculating command is effected. During the last portion of the multiplier key depression, the lever 170 moves further in counter-clockwise direction with regard to Fig. 12, while the control train 221 is arrested by means of the abutment 224 and spring 229 yields. Of particular importance in connection with the machine according to the present invention is the locking action effected by the flap 142 on the key stems of the multiplying device. This locking allows an actuation of the selector keys only when the sensing slide 144 is in its rest position. As soon as one of these selector keys has been depressed, all keys are locked. A new calculating command can, therefore, be given only after the preceding command has been executed.

Figure 13 shows a total top view of the calculating machine according to the invention. On the left side of the keyboard, there is arranged the key bank 248a with the selector keys 1 to 9 for the multiplying device. On the right-hand side, there are located the usual command members 131, 135 for leftward and rightward carriage shift, for addition and subtraction 131, 132, for clearing of the keyboard, for clearing of the counting mechanism, etc. The reference numeral 249 designates the stationary frame while the reference numeral 250 designates the movable carriage.

The arrangement of the multiplication keys in one row on the left side of the keyboard has the advantage that these keys can easily be actuated by the left hand so that the right hand is free for writing. It is, of course, understood that the selector keys may also be provided at any other convenient place in the machine, and in any desired arrangement, for instance in two groups side by side. An essential feature of the calculating machine according to the present invention consists in that only very short key stroke is required, and only a small effort is necessary for actuating the selector keys. By depressing the keys too fast, a miscalculation will be impossible with the machine according to the invention.

It is, furthermore, to be understood that the present invention is, by no means, limited to the particular construction shown in the drawing but also comprises any modifications within the scope of the appended claims.

What we claim is:

1. In a calculating machine having a motor, a differential actuator, a first normally disengaged power transmission mechanism for connecting said motor to said actuator, a first spring power operated control means for engaging said first power transmisison mechanism, an accumulator carriage transversely shiftable with respect to said actuator, a carriage shifting mechanism, a second normally disengaged power transmisison mechanism for connecting said motor to said carriage shifting mechanism, a second spring power operated control means for engaging said second power transmission mechanism, first and second latch means normally holding said first and second power operated control means respectively in ineffective positions, interlocking means operatively connected to said first and second control means for locking one of said spring power operated control means in a partially operated position in which the respective latch means is disengaged for engaging said respective power transmission mechanism subsequent to the operation of the first engaged power transmission mechanism, a bank of multiplier selector keys, means operable by said keys for concurrently releasing said first and second latch means, and multiplication control means differentially settable by said keys for disabling said latch releasing means, disengaging said first power transmission mechanism and terminating operation of said actuator, whereby said second control means is released by said interlock to engage said second power transmission mechanism.

2. In a calculating machine having a motor, a differential actuator, a first normally disengaged power transmission mechanism for connecting said motor to said actuator, a first pair of spring power operated control means for engaging said first power transmission mechanism and alternatively controlling positive or negative operation of said actuator, an accumulator carriage transversely shiftable with respect to said actuator, a carriage shifting mechanism, a second normally disengaged power transmission mechanism for connecting said motor to said carriage shifting mechanism, a second spring power operated control means for engaging said second power transmission mechanism, a first pair of latching means normally holding each respective said spring power operated control means in ineffective positions, interlocking means operatively connected to said first pair and said second control means for locking said first pair or said second power operated control means in partially operated position in which the respective latch means is disengaged for engaging said respective power transmission mechanism subsequent to the operation of the first engaged power transmission mechanism, a bank of multiplier selector keys, adjustable lever means operable by said keys for concurrently releasing a selected one of said first pair and said second latch means, means operated by a selected group of said keys for adjusting said lever means, and multiplier control means differentially settable by said keys for disabling said latch releasing means, disengaging said first power transmission mechanism and terminating operation of said actuator, whereby said second control means is released by said interlock to engage said second power transmission mechanism.

3. In a motor driven calculating machine having multiplication control means comprising a multiplier key bank including depressible keys having key stems, stop means respectively connected to the stems of said keys, a spring urged slide movable in a transverse direction with respect to said key stems and provided with differentially spaced abutments for cooperation with said stop means, means normally latching said slide in an initial position, means operable by said keys to release said latching means, a locking flap means rockable from an ineffective to an effective position and biased to effective position, said key stems having two notches arranged one above the other and adapted to be alternatively engaged by said flap means in the depressed or undepressed positions of said keys, pin means on said locking flap means, and controlling means on said slide cooperating with said pin means to hold said locking flap means in ineffective position in the initial position of said slide and to release said locking flap means for movement to effective position when said slide is released by said latching means.

4. In a calculating machine having a motor, a differential actuator, a first normally disengaged power transmission mechanism for connecting said motor to said actuator, a first pair of spring power operated control means for engaging said first power transmission mechanism and alternatively controlling positive or negative operation of said actuator, an accumulator carriage transversely shiftable with respect to said actuator, a carriage shifting mechanism, a second normally disengaged power transmission mechanism for connecting said motor to said carriage shifting mechanism, clutch means including second spring power operated control means for engaging said second power transmission mechanism, a first pair of latching means normally holding each respective spring power operated control means in ineffective position, interlocking means operatively connected to said first pair and to said second control means to make one of said first control means effective to restrain operation of said second control means until after said first control means has been moved to its ineffective position, second normally disengaged power transmission mechanism for conecting said motor to said carriage shifting mechanism, additional control means for short cut multiplying operation including two groups of selector keys, means effective in response to the actuation of one of said keys of one group, lever means connecting to said last mentioned means and operable to actuate said latching means for releasing one of said first and said second control means, shifting means operable in response to the actuation of a key of the other said two groups to shift said lever means for making effective the other of said first and said second control means, actuating means operatively connected to said clutch means and adjustable by said lever means for actuating the latching means of the first mentioned of said first control means during a cycle of said clutch means and releasing said first control means.

5. In a motor driven calculating machine, a differential actuator, a first normally disengaged power transmission mechanism for connecting said motor to said actuator, main clutch means including first and second spring power operated control means for engaging said main clutch means, auxiliary clutch means operatively connected to said main clutch means for effecting a preparatory and resetting cycle, an accumulator carriage transversely shiftable with respect to said actuator, a carriage shifting mechanism, a second normally disengaged power transmission mechanism for connecting said motor to said carriage shifting mechanism, a normally disengaged third spring power operated control means for engaging said second power transmission mechanism, three latching means normally holding each respective spring power operated control means in ineffective position, multiplication control means for shortcut multiplying operation including two groups of selector keys, a control train interposed between said spring power operated control means and said keys for engaging said first and third control means, shifting means operable in response to the actuation of said keys of one of the two groups for shifting said lever means from a first to a second position to thereby engage said second and said third control means, actuating means operatively connected to said second power transmission mechanism and adjustable by said lever means for actuating said latching means of the first control means during a cycle of said power transmission mechanism and engaging said first control means, interlocking means operatively connected to said auxiliary clutch means and operable during said preparatory cycle for locking said control train in its second position and also operable during the resetting cycle for releasing said control train, and resetting means associated with said control train for resetting the same to its first position.

6. In a motor driven calculating machine, a differential actuator, a first normally disengaged power transmission mechanism for connecting the driving motor for said calculating machine with said actuator, main clutch means including first spring power operated control means for engaging said main clutch means, auxiliary clutch means operatively connected to said main clutch means for effecting a preparatory and resetting cycle, an accumulator carriage transversely shiftable with respect to said actuator, a carriage shifting mechanism, a second normally disengaged power transmission mechanism for connecting said motor to said carriage shifting mechanism, a second spring power operated control means for engaging said second power transmission mechanism, multiplication control means including selector keys, a control train movable from an ineffective to an effective position for making said first and second control means effective in predetermined sequence, spring power operated lever means connected to said control train for rocking the latter from its ineffective to its effective position, latching means normally locking said spring power operated lever means in ineffective position, actuating means operable in response to the actuation of said keys for actuating said latching means to release said spring power operated lever means, and means operatively connected to said auxiliary clutch means to shift said actuating means out of the range of said latching means during said preparatory cycle and during the resetting cycle to release said actuating means for return to its effective position.

7. A calculating machine according to claim 6, including means operatively connected to said second spring power operated control means enabling said shifting mechanism to initiate transverse carriage shifting in one direction and for shifting said actuating means out of the range of said latching means during a carriage shift.

References Cited in the file of this patent
UNITED STATES PATENTS

| | | |
|---|---|---|
| 2,215,263 | Eichler | Sept. 17, 1940 |
| 2,304,329 | Avery | Dec. 8, 1942 |
| 2,397,745 | Kiel | Apr. 2, 1946 |
| 2,416,809 | Avery | Mar. 4, 1947 |

FOREIGN PATENTS

| | | |
|---|---|---|
| 672,771 | Great Britain | May 28, 1952 |